(12) United States Patent
Kangas et al.

(10) Patent No.: US 8,670,478 B2
(45) Date of Patent: Mar. 11, 2014

(54) LOAD ESTIMATION IN FREQUENCY DOMAIN PRE-EQUALIZATION SYSTEMS

(75) Inventors: Ari Kangas, Lidingö (SE); Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 34 days.

(21) Appl. No.: 13/634,255

(22) PCT Filed: Jun. 10, 2010

(86) PCT No.: PCT/SE2010/050649
§ 371 (c)(1),
(2), (4) Date: Sep. 12, 2012

(87) PCT Pub. No.: WO2011/155882
PCT Pub. Date: Dec. 15, 2011

(65) Prior Publication Data
US 2013/0003814 A1    Jan. 3, 2013

(51) Int. Cl.
*H04B 1/00*    (2006.01)
(52) U.S. Cl.
USPC .......... 375/144; 375/148; 375/346; 455/63.1; 455/226.1; 455/296
(58) Field of Classification Search
USPC ......... 375/144, 148, 340, 346, 349; 455/13.4, 455/501, 63.1, 67.11, 226.1–226.3, 296
See application file for complete search history.

(56) References Cited

U.S. PATENT DOCUMENTS 8,472,573 B2 * 6/2013 Solum .......................... 375/345

2011/0135044 A1 * 6/2011 Kolze et al. ................... 375/346
2012/0163420 A1 * 6/2012 Persson et al. ................ 375/144

FOREIGN PATENT DOCUMENTS

| EP | 2015481 A1 | 1/2009 |
|----|-----------|--------|
| WO | 2006/076969 A1 | 7/2006 |
| WO | 2007/024166 A1 | 3/2007 |
| WO | 2007/117188 A1 | 10/2007 |
| WO | 2008/097145 A1 | 8/2008 |

OTHER PUBLICATIONS

Odhah, N. et al. "Frequency Domain Pre-equalization for MIMO Broadband CDMA Communication Systems." 26th National Radio Science Conference (NRSC2009), Mar. 17-19, 2009, pp. 1-8. Egypt.

* cited by examiner

*Primary Examiner* — Dac Ha
(74) *Attorney, Agent, or Firm* — Murphy, Bilak & Homiller, PLLC (57) ABSTRACT

An arrangement (10) for noise rise estimation comprises a front end signal conditioning arrangement (9) and an interference whitener (14) connected thereto. The interference whitener (10) is arranged for providing interference whitening of a front end signal. A processor (20) is arranged for measuring received total wideband power received at the front end signal conditioning arrangement (9) a plurality of times. An estimate of a noise floor measure is computed by the processor (20) based on the measured received total wideband powers. The processor (20) determines an equivalent total wideband power of the output from the interference whitener (14). The processor (20) also calculates a noise rise measure, based on the equivalent total wideband power and the noise floor measure, and compensates the noise rise measure for the interference whitening. A digital receiver (12) is connected to the output from the interference whitener (14).

15 Claims, 9 Drawing Sheets

LOAD ESTIMATION IN FREQUENCY DOMAIN PRE-EQUALIZATION SYSTEMS

TECHNICAL FIELD

The present invention relates in general to methods and devices for estimation of power-related quantities in cellular communications systems and in particular to such methods and devices in cellular communications systems using interference whitening.

BACKGROUND

Wideband Code Division Multiple Access (WCDMA) telecommunication systems have many attractive properties that can be used for future development of telecommunication services. In order to retain stability of a cell, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements.

Since the Radio Base Station (RBS) tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the rise in the interference becomes large and the risk for instability, a so called power rush, increases. It is thus a necessity to schedule high capacity uplink channels, like the enhanced uplink (EUL) channel in WCDMA, so that one can insure that instability is avoided. In order to do so, the momentary load must be estimated in the RBS or any node connected thereto. This enables the assessment of the capacity margin that is left to the instability point.

One approach to improve load estimation is disclosed in the published international patent application WO 2006/076969. A minimum value of a power quantity, preferably a difference between the instantaneous total received wideband power and the instantaneous sum of powers of all links used in the same cell, is used as an estimate of an upper limit of the thermal noise floor, based on which a noise rise measure can be estimated. An optimal and soft algorithm for noise rise estimation based on a similar basic idea of minimum values is disclosed in the published international patent application WO 2007/024166.

To handle increasing uplink data rates, interference cancellation (IC) or interference suppression (IS) is being introduced in WCDMA. A conventional procedure to perform IC is summarized by the following steps. A channel model of the interferer to be cancelled is estimated. This does not cause any additional operations, since this channel model is anyway needed. The transmitted signal of the interferer to be cancelled is also decoded. This is also anyway needed. A replica of the received signal of the interferer to be cancelled is then created, by use of the channel model and the decoded signal. This replica may e.g. be reconstructed as an IQ chip stream. The replica of the interfering signal is subsequently subtracted from the received signal of the user to be decoded, thereby hopefully reducing the remaining power of the interferer to very low power levels.

This procedure obviously affects the load measurement functionality of the WCDMA EUL. Thus, the scheduler must be aware of the instantaneous uplink load in several signal points of the new IC receiver structure in order to be able to utilize the entire amount of resources. Unless such load estimates are made available it will not be possible to exploit the link gains fully, when scheduling EUL users. In the published international patent application WO 2008/097145, load estimation with IC or IS of this conventional type is handled in analogy with earlier noise rise estimation procedures.

Another approach to limit the effect of interference is to use some kind of interference whitening approaches. Frequency Domain Pre-Equalization (FDPE) has been developed for next generation WCDMA base band hardware. The main advantages associated with FDPE are a relatively low complexity, a simple receiver structure, algorithms that may re-use LTE ASIC accelerators for fast Fourier transforms and at the same time a high interference suppression gain is achieved.

In order to utilize the reduced interference provided by the FDPE, the load estimations have to be performed taking the interference whitening of the FDPE into account. However, in contrary to what is valid for interference cancellation based on regeneration and subtraction, the thermal noise floor is changed in the same manner as the interference reduction obtained by the FDPE process, and can no longer be treated as constant after interference whitening. A treatment analogue of WO 2008/097145 can therefore not be used for achieving a noise rise estimation, the reason being that WO 2008/097145 requires the noise floor to be constant. There is thus a problem of using the created reduced interference, since no reliable noise rise estimation is available.

SUMMARY

An object of the present invention is thus to provide methods and arrangements for providing reliable noise rise estimations in wireless communication systems using interference whitening methods, such as the FDPE.

The object is achieved by methods and arrangements according to the enclosed independent patent claims. Preferred embodiments are defined by the dependent claims. In general, in a first aspect, a method for noise rise estimation in a wireless communication system comprises measuring of received total wideband power a plurality of times. An estimate of a noise floor measure is computed based on at least a number of the measured received total wideband powers. An interference whitening of a total received signal is performed. An equivalent total wideband power is determined as an available total wideband power after the interference whitening. A noise rise measure is calculated, based at least on the equivalent total wideband power and the noise floor measure. The calculation comprises compensating of the noise rise measure for the interference whitening. The total received signal after the interference whitening is processed in a digital receiver.

In a second aspect, an arrangement for noise rise estimation in a wireless communication system comprises a front end signal conditioning arrangement and an interference whitener connected to the front end signal conditioning arrangement. The interference whitener is arranged for providing interference whitening of a front end signal at an output. A processor is connected to the front end signal conditioning arrangement and to the output from the interference whitener. The processor is arranged for measuring received total wideband power received at the front end signal conditioning arrangement a plurality of times. The processor is further arranged for computing an estimate of a noise floor measure based on at least a number of the measured received total wideband powers. The processor is also arranged for determining an equivalent total wideband power as an available total wideband power on the output from the interference whitener. The processor is further arranged for calculating a noise rise measure, based at least on the equivalent total wideband power and the noise floor measure, and for compensating the noise rise measure for the interference whitening. A digital receiver is connected to the output from the interference whitener.

In a third aspect, a base station of a wireless communication system comprises an arrangement for noise rise estimation according to the second aspect.

One advantage with the present invention is that the reduced interference levels achieved by FDPE can be fully utilized to increase the total available capacity of a wireless communication system.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the entire disclosure, bold letters in equations refer to vector or matrix quantities.

In the drawings, corresponding reference numbers are used for similar or corresponding parts.

Figure 1:
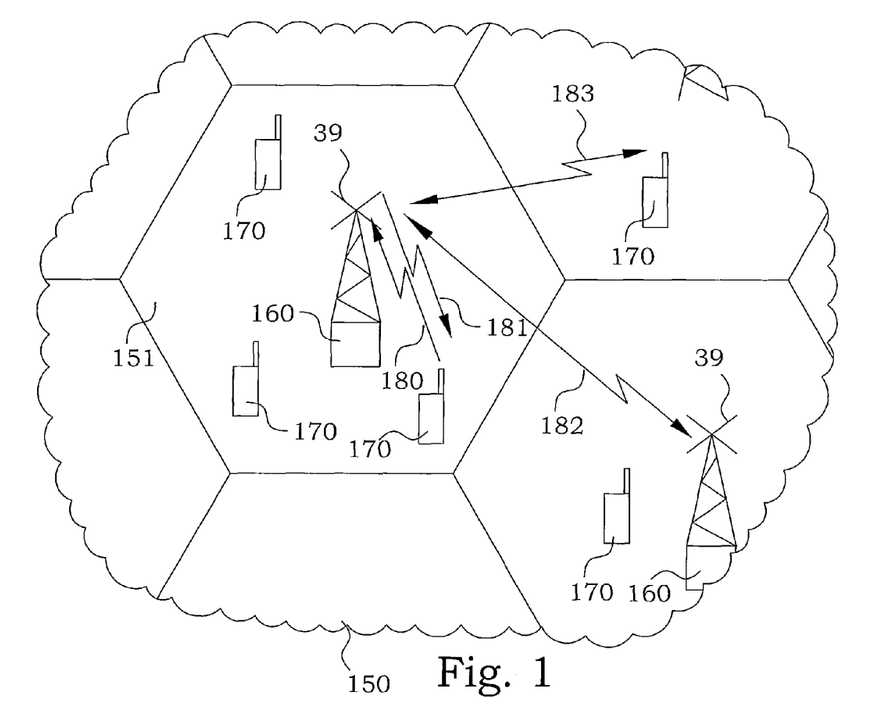
FIG. 1 is a schematic illustration of a wireless communication system.

The present invention relates to arrangements and methods in wireless communication systems. FIG. 1 illustrates a schematic view of an embodiment of such a wireless communication system 150. A radio base station 160 communicates via its antenna/antennas 39 with a multitude of user equipments (UE) 170 situated within a cell 151 of the wireless communication system 150. Radio signals transmitted from the RBS 160 to the UEs 170 are denoted as downlink signals 181, and radio signals transmitted from the UEs 170 to the RBS 160 are denoted as uplink signals 180. This invention mainly considers the uplink signals, whereby arrangements for noise rise estimation typically are provided in the RBS 160. Besides the intentional uplink signals 180, the RBS 160 also receives interfering signals 182, 183.

In order to understand the solved problems and advantages with the present invention, a short summary of prior art load estimation principles are presented as a background. Without IC, the load at an antenna connector is given by the noise rise, or rise over thermal (RoT), RoT(t), defined by:

$$RoT(t) = \frac{RTWP(t)}{N(t)}, \quad (1)$$

where N(t) is the thermal noise level as measured at the antenna connector. The RTWP(t) is unaffected by any despreading applied. It remains to define what is meant with RTWP(t). The definition used here is simply the total wideband power:

$$RTWP(t) = \sum_{k=1}^{K} P_k(t) + I^N(t) + N(t), \quad (2)$$

also measured at the antenna connector. Here $I^N(t)$ denotes the power as received from neighbour cells ($^N$) of the WCDMA system. As will be seen below, the major difficulty of any RoT estimation algorithm is to separate the thermal noise power from the interference from neighbour cells.

Another specific problem that needs to be addressed when determining the load is that the signal reference points are, by definition, at the antenna connector. The measurements are however obtained after the analogue signal conditioning chain. The analogue signal conditioning chain does introduce a scale factor error of about 1 dB (1-sigma) that is difficult to compensate for. Fortunately, all powers of (2) are equally affected by the scale factor error so when (1) is calculated, the scale factor error is cancelled as $$RoT^{Digital\ Receiver}(t) =$$
$$\frac{RTWP^{Digital\ Receiver}(t)}{N^{Digital\ Receiver}(t)} = \frac{\gamma(t)RTWP^{Antenna}(t)}{\gamma(t)N^{Antenna}(t)} = Rot^{Antenna}(t). \quad (3)$$

In order to understand the fundamental problem of neighbour cell interference when performing load estimation, note that $$I^N(t)+N(t)=E[I^N(t)]+E[N(t)]+\Delta I^N(t)+\Delta N(t) \quad (4)$$

where E[ ] denotes mathematical expectation and where Δ denotes the variation around the mean. The fundamental problem can now be clearly seen. Since there are no measurements available in the RBS that are related to the neighbour cell interference, a linear filtering operation can at best estimate the sum E[$I^N$(t)]+E[N(t)]. This estimate cannot be used to deduce the value of E[N(t)]. The situation is the same as when the sum of two numbers is available. Then there is no way to figure out the values of the individual numbers. This issue is analysed rigorously for the RoT estimation problem in published international patent application WO 2007/024166 where it is proved that the noise power floor is not mathematically observable.

Figure 2:
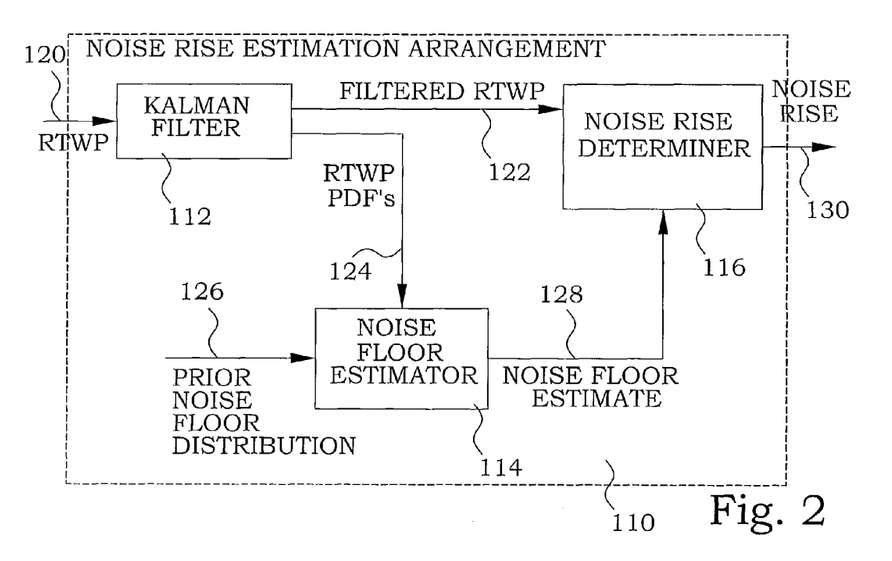
FIG. 2 is a schematic illustration of a noise rise estimation arrangement.

An embodiment of the RoT estimation algorithm currently in use is depicted in FIG. 2. It is described in detail in the published international patent application WO 2007/024166. The algorithm estimates the RoT, as given by (1). The main problem solved by the estimation algorithm is the accurate estimation of the thermal noise floor N(t). Since it is not possible to obtain exact estimates of this quantity due to the neighbour cell interference, the estimator therefore applies an approximation, by consideration of the soft minimum as computed over a relative long window in time.

In particular, an arrangement 110 for noise rise estimation in a wireless communication system is supplied with RTWP measurements 120. The RTWP measurements 120 are used in a Kalman filter 112 to produce filtered estimates 122 of the RTWP as well as probability density functions 124 of the RTWP. These probability density functions 124 are provided to a noise floor estimator 114, in which noise floor estimates 128 are provided with knowledge of a prior noise floor distribution 126. The noise floor estimator 114 operates preferably with a sliding window algorithm. The noise floor estimates 128 and the filtered estimates 122 of the RTWP are provided to a noise rise determiner 116, producing an output of a noise rise measure, in this embodiment a RoT value 130.

It is important to understand that this estimation relies on the fact that the noise floor is constant over very long periods of time (disregarding the small temperature drift).

The sliding window algorithm of the above section has the disadvantage of requiring a large amount of storage memory. This becomes particularly troublesome in case a large number of instances of the algorithm are needed, as may be the case when IS/IC is introduced in the uplink. To reduce the memory consumption a recursive algorithm was disclosed in the published international patent application WO 2007/0055626. That algorithm reduces the memory requirements of the sliding window scheme discussed above at least by a factor of 100. The invention disclosed here is applicable both to the sliding window RoT estimation algorithm and the recursive algorithm.

Figure 3:
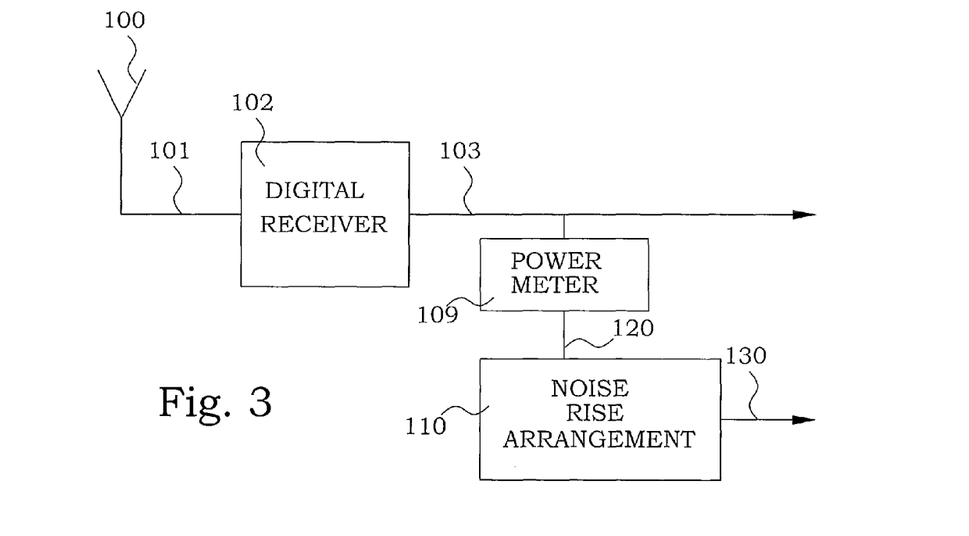
FIG. 3 is a schematic illustration of a receiver chain including a noise rise arrangement.

FIG. 3 schematically illustrates the arrangement 110 for noise rise estimation in relation to the receiver chain. An antenna 100 receives electromagnetic signals and gives rise to a received analogue signal 101, which is provided to a digital receiver 102. The digital receiver 102 provides a stream of digital signals 103 representative to the analogue signals, however, as mentioned above modified with a certain scale factor. A measurement unit 109 is connected to the stream of digital signals 103 and performs measurements of received total wideband powers 120, which are handed on to the arrangement 110 for noise rise estimation.

Figure 4:
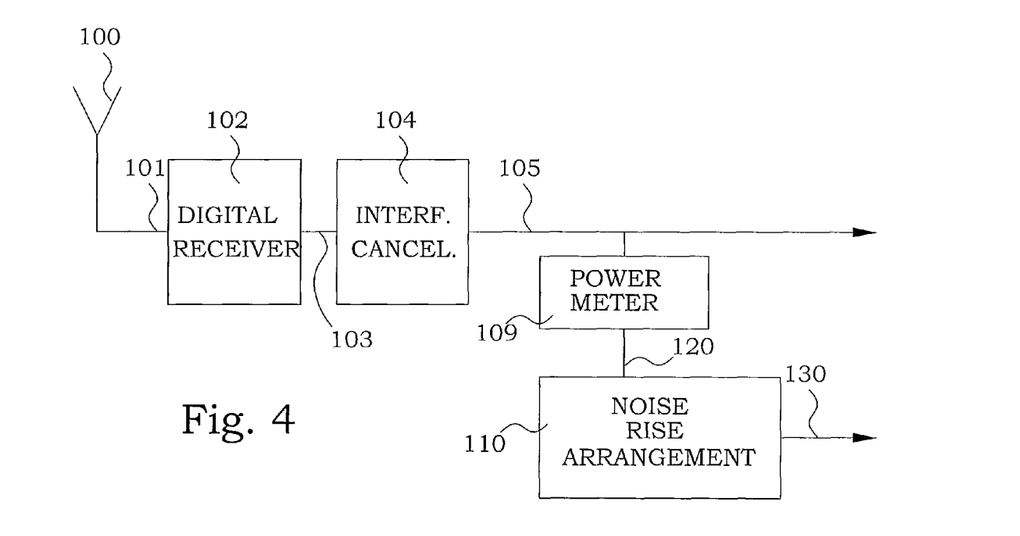
FIG. 4 is a schematic illustration of a receiver chain including interference cancellation and a noise rise arrangement.

As mentioned in the background section, different interference cancellation methods based on regeneration and subtraction are often used. This is schematically illustrated in FIG. 4. The stream of digital signals 103 is provided to an interference canceller 104, where signals not intended for a particular user are removed. An interference cancelled digital signal 105 intended for a particular user is provided as output. As also mentioned before, load estimation can be applied also to such interference cancelled digital signal 105, where the measured RTWP measure refers to the digital signal after interference cancelling. For IC with regeneration and subtraction there is no change of the scale factor for the thermal noise power floor. The consequence is that the RoT estimation algorithms are still applicable in this case, since a constant noise power level is estimated.

It is important to observe that the effect of this procedure is different for different users, since an interferer is a user on its own. The consequence for load estimation is that there is no longer a uniform way to look on the interference of the WCDMA uplink. The load instead becomes individual for each user.

Finally notice that IC with regeneration and subtraction is more straightforward than with FDPE since there is no change of the thermal noise power floor. The consequence is that the RoT estimation algorithms are still applicable in this case, since a constant noise power level is estimated.

The present invention provides solutions where load estimations reflect the reduced interference experienced by exploiting interference whitening in connection with the front end signal conditioner of the receivers. The load exploiting e.g. FDPE can be estimated.

The present invention disclosure is focused on FDPE. However, also interference whitening systems being applied in direct connection to the front end signal conditioner can be configured in a similar manner.

Figure 5:
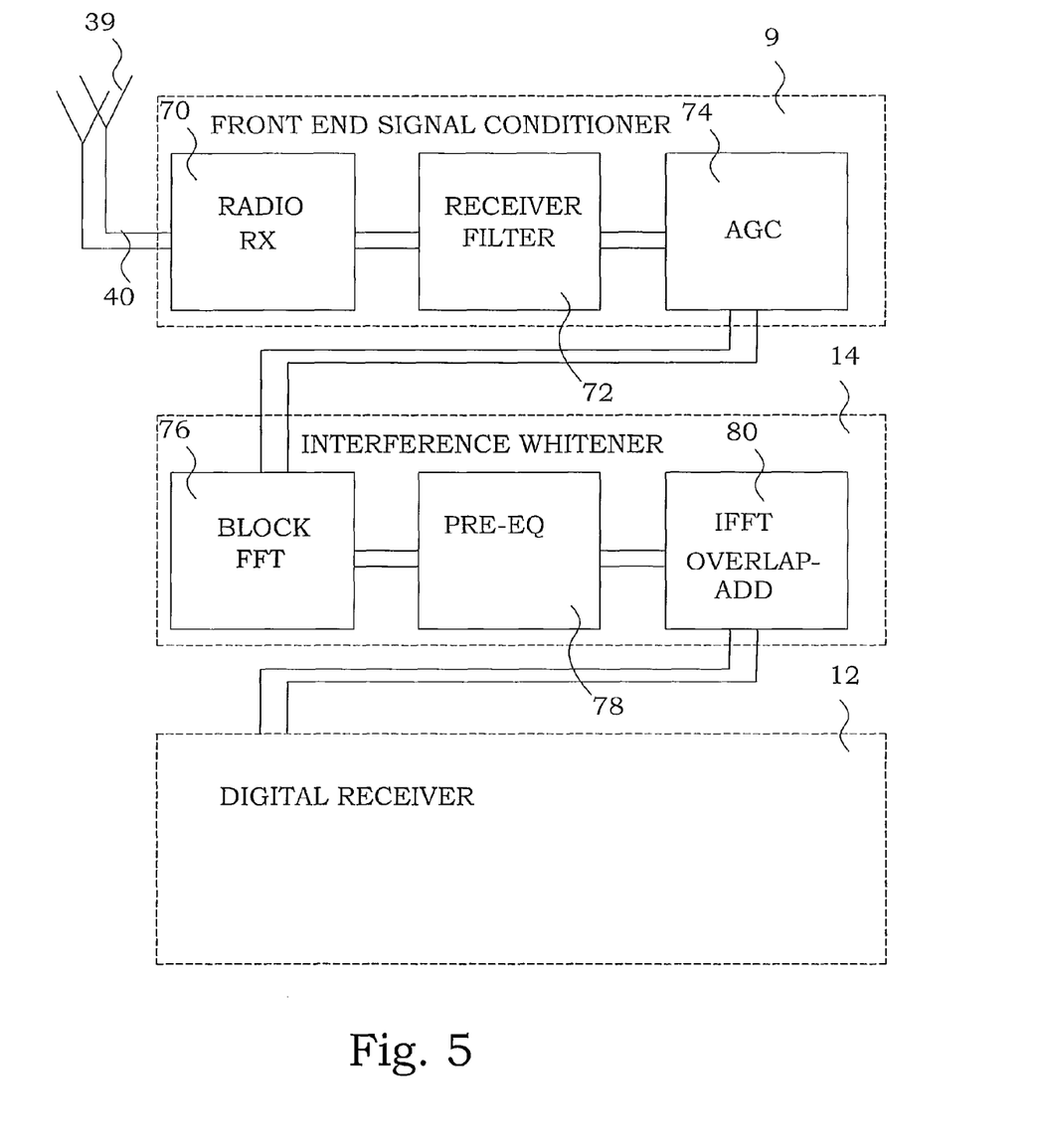
FIG. 5 is a schematic view of a FDPE system.

In order to fully understand the main benefits of the invention, a short review of FDPE as such is first given. The general FDPE receiver structure is depicted in FIG. 5. A multiple of antennas 39 provides signals 40 to a radio receiver 70 of a front end signal conditioner 9. The front end signal conditioner 9 typically also comprises a receiver filter and an Automatic Gain Control (AGC) function. The signals 42 output from the front end signal conditioner 9 are provided to an interference whitener 14, in this embodiment a FDPE unit 43. The FDPE unit 43 comprises a block FFT (Fast Fourier Transform) 76 for transforming the signal into the frequency domain. A pre-equalization block 78 operates on the signal in the frequency domain to perform an interference whitening process. In other words, the pre-equalization block makes the spectrum of the signal flat, thereby reducing any spectral peaks. These reductions correspond to reduced interference levels. The pre-equalized signal is provided to an IFFT (Inverse Fast Fourier Transform) and overlap adding unit 80 for transforming the signal back into the time domain. The so interference whitened signal is then provided to the digital receiver 12. The FDPE is also sometimes classified as an IS (interference suppression) technique.

There are some advantages associated with this structure. The FDPE structure gives significant IS gains. The FDPE structure achieves IS for all users simultaneously, thereby reducing the computational complexity as compared with structures that performs processing individually for the different users. Processing blocks are inserted in the uplink receiver structure that is already in place for other purposes, thereby reducing development costs. The fast Fourier transform (FFT) accelerator hardware developed for the Long Term Evolution (LTE) cellular system can be reused, thereby creating further synergies.

The FDPE algorithm performs interference whitening in the frequency domain. To explain this in detail, the following time domain signal model can be used:

$$v(t) = \sum_{l=0}^{L-1} h(l)z(t-l) + \eta_v(t). \quad (5)$$

Here v is the received (vector due to multiple antennas) signal, with chip sampling rate, h is the radio channel net response, z is the desired (transmitted) signal and $\eta_v$ denotes thermal noise and interference. t denotes discrete time.

Taking the Fourier transform, translates (5) into:

$$V(m) = H(m)Z(m) + N(m) \quad (6)$$

where the quantities are the discrete Fourier transform of the corresponding quantities in (5). Now a whitening filter can be applied in the frequency domain. It is well known that the filter that minimizes the mean square error (the MMSE solution) is given by:

$$W_{MMSE}(m) = \left(\hat{R}_d(m)\right)^{-1} \hat{H}(m) = \quad (7)$$

$$\left(\begin{bmatrix} R_{0,0}(m) & R_{0,1}(m) & \cdots & R_{0,N_r-1}(m) \\ R_{1,0}(m) & R_{1,1}(m) & & \\ \vdots & & \ddots & \\ R_{N_r-1,0(m)} & & & R_{N_r-1,N_r-1}(m) \end{bmatrix}\right)^{-1} \begin{bmatrix} \hat{H}_0(m) \\ \hat{H}_1(m) \\ \\ \hat{H}_{N_r-1}(m) \end{bmatrix}$$

where $\hat{R}_d(m)$ is an estimate of the covariance matrix of V(m). Note that this estimate can e.g. obtained as an average over N different data blocks, like:

$$\hat{R}_d(m) = \frac{1}{N} \sum_{k=0}^{N-1} V_k(m) V_k^H(m) \quad (8)$$

By using a Cholesky decomposition, the covariance matrix between the antenna elements can be factored as:

$$L(m) \cdot L^H(m) = \hat{R}_d(m) \quad (9)$$

The idea behind FDPE is to exploit this factorization and write:

$$W_{MMSE}(m)=(L^H(m))^{-1}((L(m))^{-1}\hat{H}(m))= \\ W_{pre}(m)((L(m))^{-1}\hat{H}(m)), \quad (10)$$

so that the desired signal in the frequency domain becomes MMSE pre-equalized in the frequency domain, i.e. given by:

$$Z_{pre}(m)=W_{pre}(m)V(m). \quad (11)$$

This is a user independent processing, which is the same for all users. Hence the wideband received signal is transformed to the frequency domain and the covariance matrix is computed and Cholesky factored, after which (11) is computed. The signal is then transformed back to the time domain where it is further processed for each user in the digital receiver. Note that the channels experienced by the receivers in such processing are obtained from the second factor of (10). The FFT and IFFT blocks have low computational complexity and are preferably implemented in HW.

The problems with existing load estimation solutions compatible with the FDPE receive structure, known in public prior art, is that they do not reflect the reduced interference after FDPE processing. They typically overestimate the air-interface load of the uplink and thereby they cause under-scheduling in the RBS, which in turn results in a too low throughput and/or capacity. It can also cause blocking in the admission control function in the RNC, which also results in reduced throughput or capacity. Prior art load estimation solutions cannot estimate the noise power floor after the FDPE processing, since the noise power floor after FDPE processing varies with the same rate as the frame rate of the FDPE processing. The noise floor estimation instead requires a long time stability.

The present invention discloses means for uplink load estimation that reflects the gain in terms of reduced load of the FDPE receiver step, as experienced after FDPE. The processing of the invention is performed for all users simultaneously, without addressing individual users at all, thereby achieving a very low computational complexity. A further property of the invention is that the scale factor that scales the thermal noise power floor, which scale factor is caused by the FDPE receiver step itself, is computed from properties of the FDPE step. This in turn enables a compensation for the scaling. Thereby the present invention discloses ways to estimate the thermal noise power level. This is the key to the computation of the RoT, as experienced after FDPE. The information is used in the EUL scheduler of the RBS, to enhance the scheduled number of users and/or throughput of the EUL air-interface. The information is also typically signaled to the SRNC where it can be used for load based admission control. The admission control will then also become responsive the FDPE IS gains.

Figure 6A:
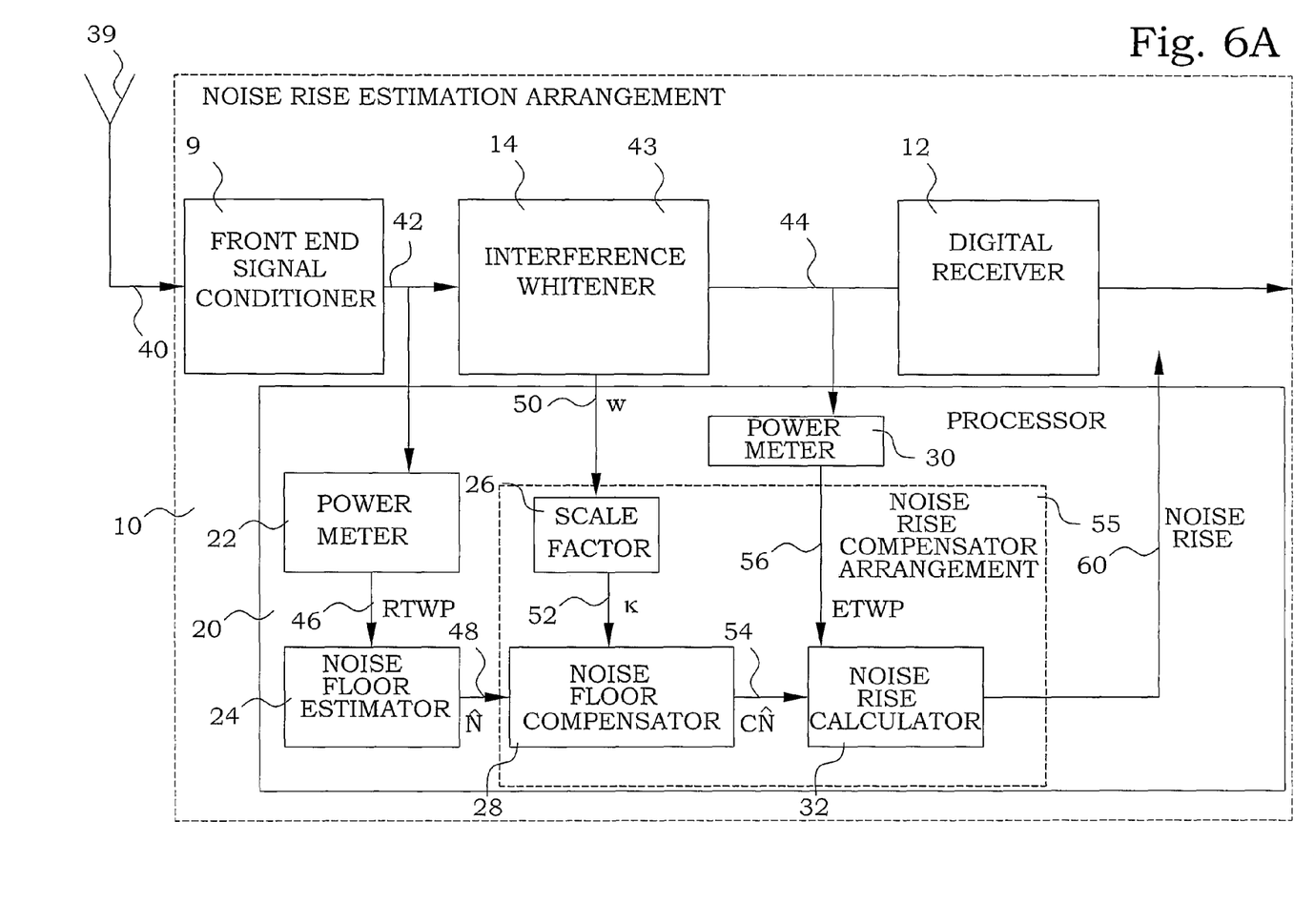
FIGS. 6A-C are schematic illustrations of a embodiments of noise rise estimation arrangements according to the present invention.

An embodiment of an arrangement 10 for noise rise estimation in a wireless communication system according to an embodiment of the present invention is schematically illustrated in FIG. 6A. The arrangement 10 for noise rise estimation comprises an antenna system 39. The antenna system 39 is typically a multi-antenna system, whereby a signal 40 provided from the antenna system 39 typically is a multi-channel signal. The signal 40 from the antenna system is received in a front end signal conditioner 9, typically performing sampling, filtering and similar processes. The signal 42 output from the front end signal conditioner 9 is a digital signal, typically of multiple channels. The arrangement 10 for noise rise estimation comprises an interference whitener 14, a digital receiver 12, and a processor 20. The interference whitener 14 is connected to the front end signal conditioner 9 for receiving digital signals 42 therefrom. The interference whitener 14 is in the present embodiment an FDPE 43. The interference whitener 14 is thus intended for providing interference whitening common for all users at an output, providing interference whitened digital signals 44. These interference whitened digital signals 44 are provided to the digital receiver 12.

The processor 20 is connected to output from the front end signal conditioner 9 and to the output from the interference whitener 14. Furthermore, the processor 20 is connected to receive information about the interference whitening process from the interference whitener 14. The processor has a power meter 22, arranged for measuring received total wideband power 46 of the signals 42 received from the front end signal conditioner 9 a plurality of times. These measured received total wideband powers 46 are provided at an output from the power meter 22. The processor 20 has further a noise floor estimator 24 connected to the output of the power meter 22. The noise floor estimator 24 is arranged for computing an estimate of a noise floor measure 48 based on at least a number of the measured received total wideband powers 46.

The processor 20 is further arranged for compensating the estimate of a noise floor measure for the interference whitening into an equivalent noise floor measure. In this embodiment, the processor 20 comprises a scale factor determiner 26, connected to the interference whitener 14. The scale factor determiner 26 is provided with at least a part of a wideband finite impulse response of a pre-equalizing filter w 50 representing the interference whitening. The wideband finite impulse response of a pre-equalizing filter w is typically given in the frequency domain, which is why the impulse response of a pre-equalizing filter has to be inverse Fourier-transformed either in the interference whitener 14 or in the scale factor determiner 26, typically in a block IFFT (not shown). Based on at least parts of this wideband finite impulse response of a pre-equalizing filter w 50, the scale factor determiner 26 determines a scale factor κ 52 representing a relation between a noise floor measure before interference whitening and a noise floor measure after interference whitening. A noise floor compensator 28 is connected to the output of the scale factor determiner 26 and the output of the noise floor estimator 24, and is arranged for compensating the estimate of a noise floor measure 48 by the scale factor 52 into a corrected noise floor measure 54.

The processor 20 also comprises a power meter 30 connected to the output of the interference whitener 14. The power meter 30 is arranged for determining an equivalent total wideband power 56 as an available total wideband power on the output from the interference whitener 14. The processor 20 further comprises a noise rise calculator 32, connected to the power meter 30 and the noise floor compensator 28. The noise rise calculator 32 is arranged for calculating a noise rise measure 60. This calculation is based at least on the equivalent total wideband power 56 and the corrected noise floor measure 54.

In this embodiment, the different functionalities of the processor 20 are illustrated as separate part units. However, anyone skilled in the art realises that the functionalities can be configured and realised in different manners, separately or integrated, fully or partly. The part units associated with the different functionalities should therefore only be considered as separate units concerning their functionality.

The scale factor determiner 26, the noise floor compensator 28 and the noise rise calculator 32 forms together a noise rise compensator arrangement 55, which based on the noise rise 48, the wideband finite impulse response of a pre-equalizing filter w 50 and the equivalent total wideband power 56 calculates a compensated noise rise measure. The scale factor can be used in different manners in the actual calculation. The effects caused by the interference whitening can be compensated by compensating of at least one of the equivalent total wideband power, the noise floor measure and a ratio between the equivalent total wideband power and the noise floor measure. Typically, only one of the quantities has to be compensated, however, in theory it would be able to e.g. compensate one factor for half the interference whitening effect and another factor for the other half. However, such solutions are only mathematical equivalences. Such equivalences are easily understood by referring to the mathematical description further below.

Figure 6B:
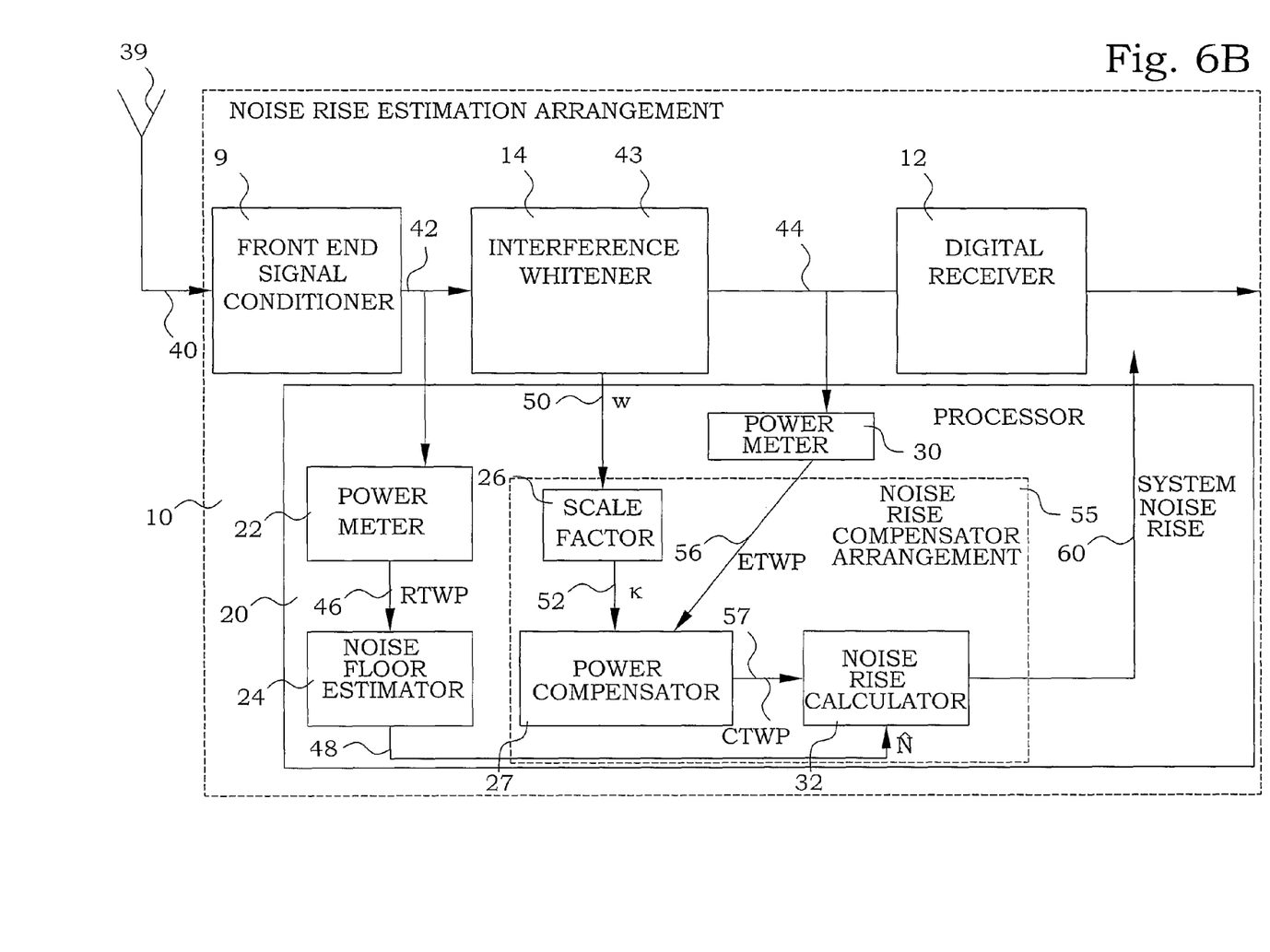

FIG. 6B illustrates an embodiment where the compensation instead is performed on the measured equivalent total wideband power. The equivalent total wideband power 56 and the scale factor κ 52 are provided to a power compensator 27. The power compensator 27 provides a compensated total power measure CTWP 57, which is a scaling of the equivalent total wideband power 56 by the scale factor κ 52. The compensated total power measure CTWP 57 and the uncompensated noise floor measure 48 are provided as inputs to the noise rise calculator 32 for provision of the correct noise rise measure 60.

Figure 6C:
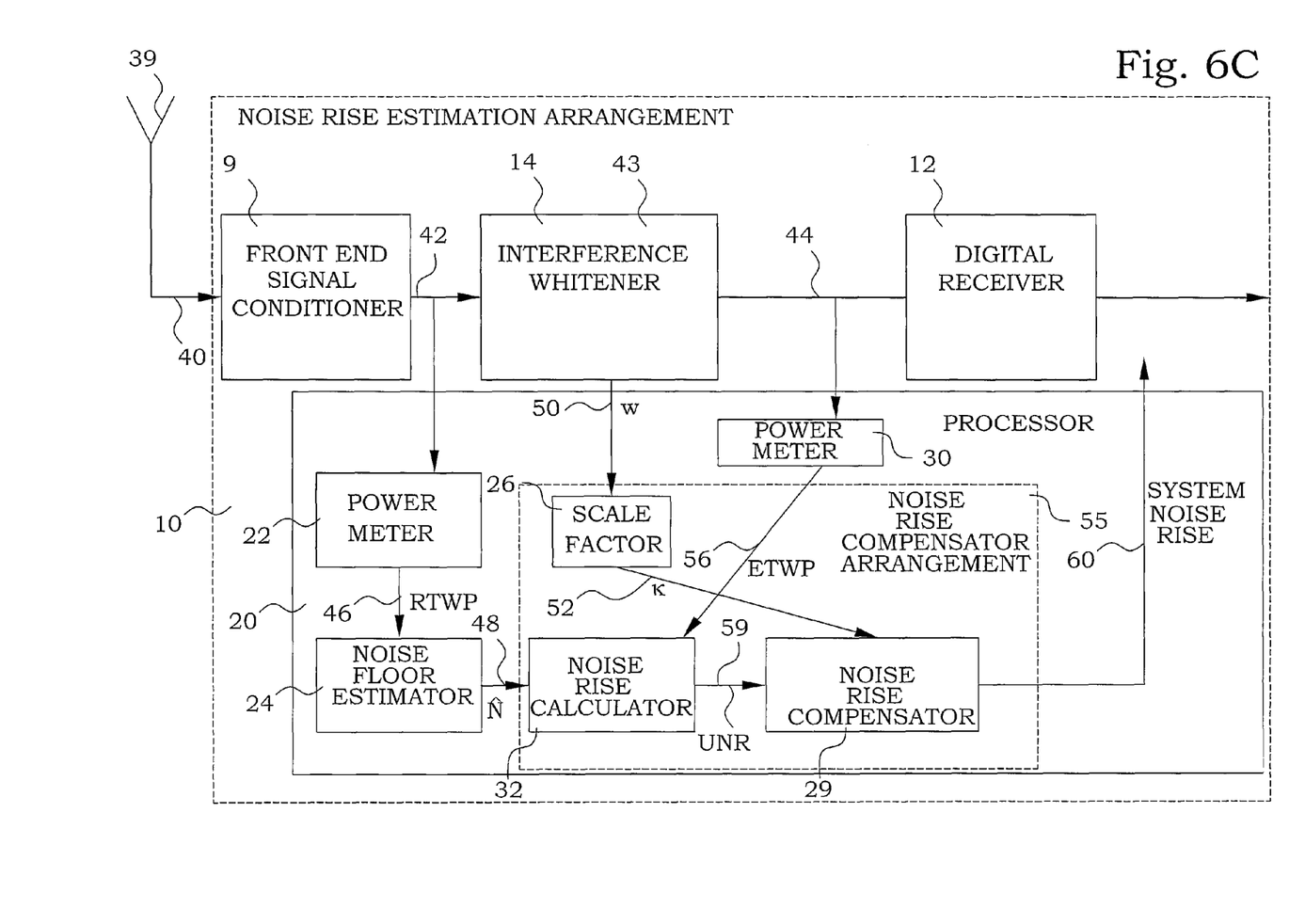

FIG. 6C illustrates another embodiment where the compensation instead is performed on the noise rise measure instead, i.e. the ratio between the equivalent total wideband power and the noise floor measure. The equivalent total wideband power 56 and the uncompensated noise floor measure 48 are provided as inputs to the noise rise calculator 32. The output from the noise rise calculator 58 then becomes an uncorrected noise rise measure 59. This uncorrected noise rise measure 59 is provided together with the scale factor κ 52 to a noise rise compensator 29, where the compensation for the interference whitening effects is performed, and a corrected noise rise measure 60 is output.

Figure 7A:
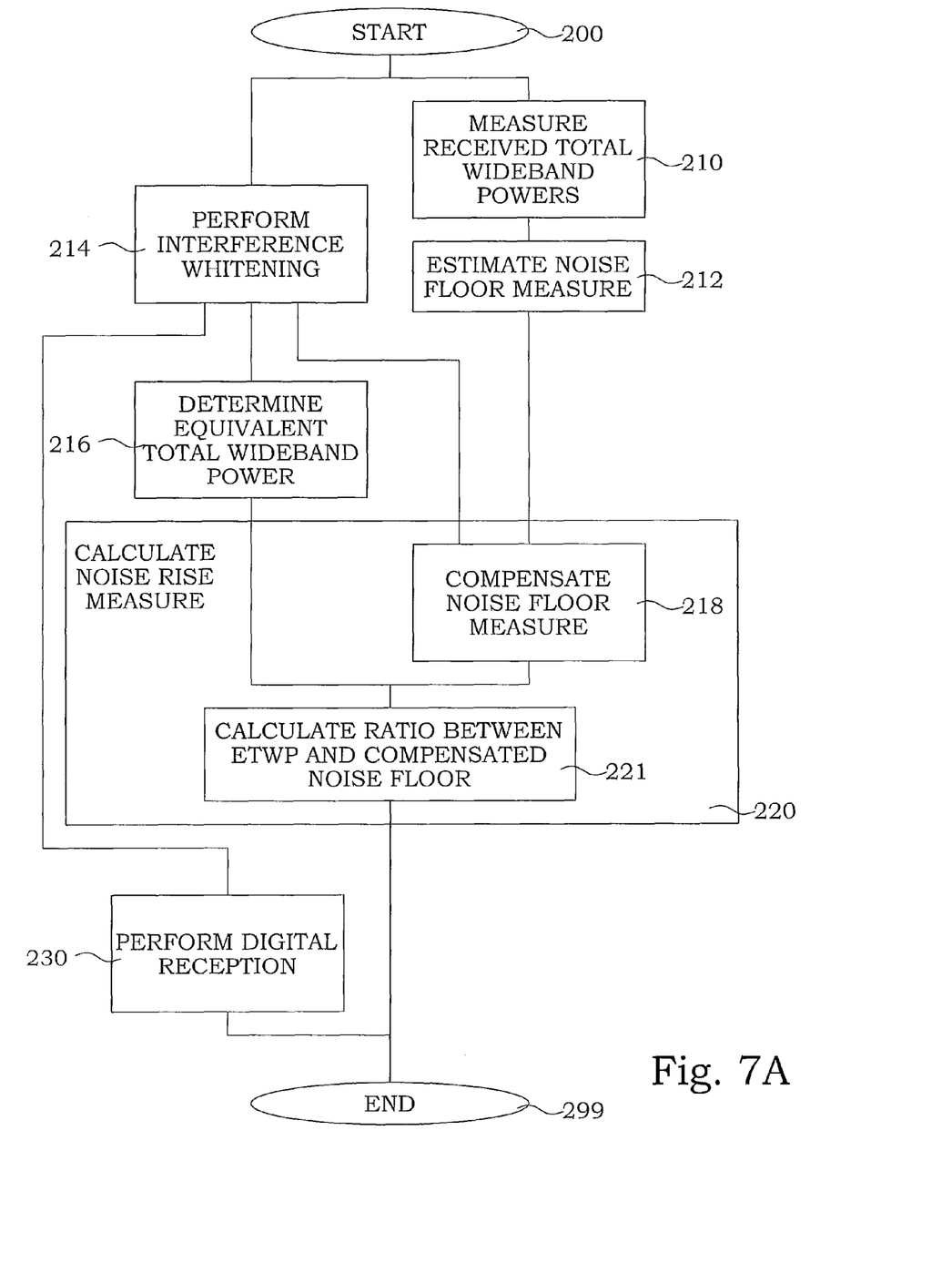
FIGS. 7A-C are flow diagrams of steps of embodiments of noise rise estimation methods according to the present invention.

FIG. 7A illustrates a flow diagram of steps of an embodiment of a method according to the present invention. The method for noise rise estimation in a wireless communication system begins in step 200. In step 210, received total wideband power is measured a plurality of times. An estimate of a noise floor measure is computed in step 212, based on at least a number of the measured received total wideband powers. In step 214, which can be performed before, during, interleaved with or after steps 210 and 212, an interference whitening is performed. The interference whitening is in this embodiment performed according to FDPE.

In step 216, an equivalent total wideband power is determined as an available total wideband power after the interference whitening. In step 218, which can be performed before, during, interleaved with or after step 216, the estimate of a noise floor measure is compensated for the interference whitening into a compensated noise floor measure. Preferably, this step of compensating 218 the estimate of a noise floor measure comprises calculation of a scale factor representing a relation between a noise floor measure before interference whitening and a noise floor measure after interference whitening. In an even more preferred embodiment, the scale factor κ is calculated based on at least a part of a wideband finite impulse response of a pre-equalizing filter representing the interference whitening. More detailed descriptions are provided further below. Then, a noise rise measure is calculated in step 221 based at least on the equivalent total wideband power and the compensated noise floor measure by calculating a ratio between the equivalent total wideband power and the compensated noise floor measure.

Steps 218 and 221 together form a general step of calculating 220 a noise rise measure. This step may in other embodiments be configured somewhat differently.

The procedure of receiving signals also typically comprises the step 230, where the actual digital reception is performed. The procedure ends in step 299.

Figure 7B:
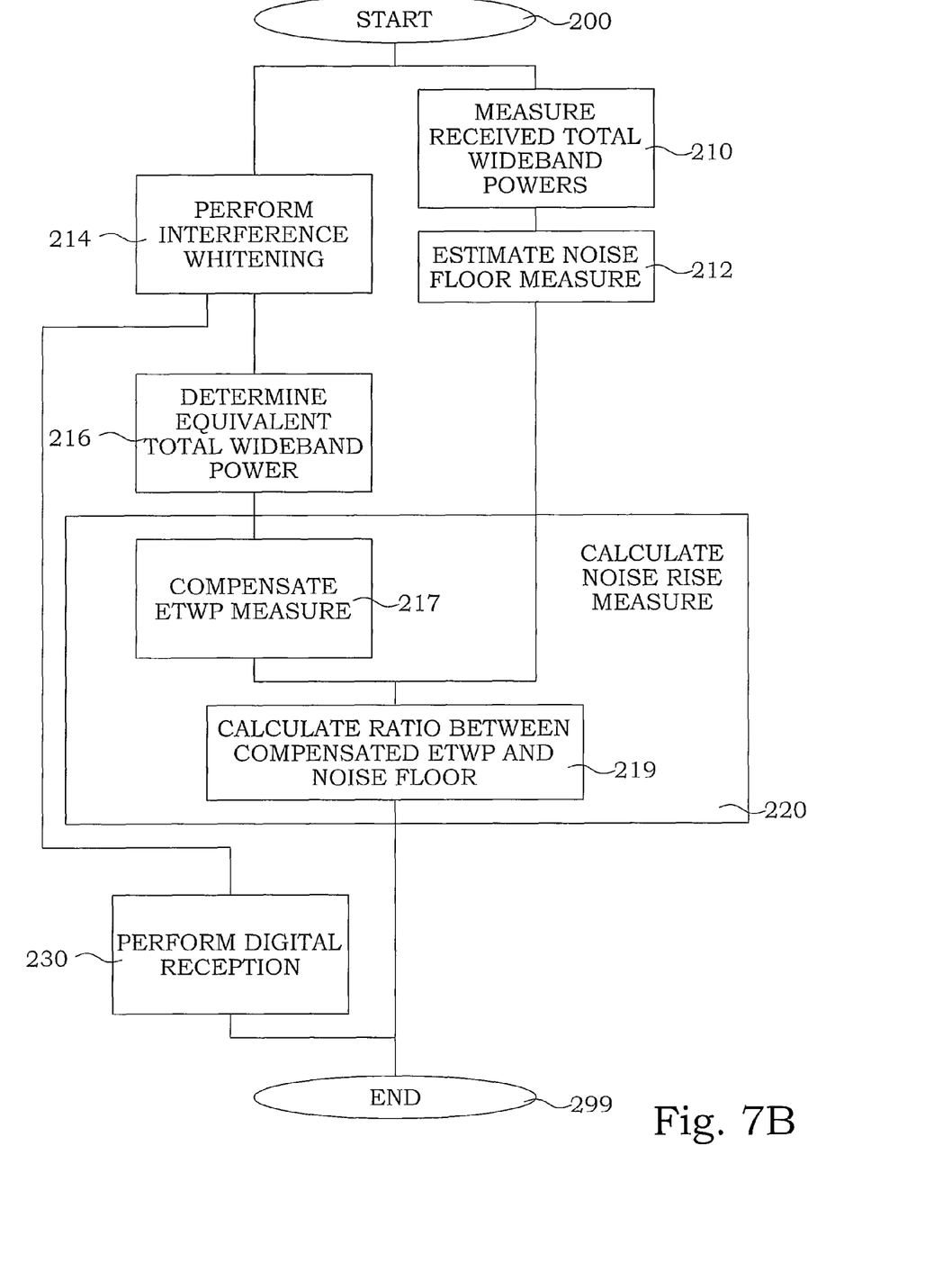

FIG. 7B illustrates another embodiment, in which step 220 of calculating a noise rise measure is configured differently. The equivalent total wideband power is compensated for the effects caused by the interference whitening in step 217, giving a compensated total wideband power. This compensated total wideband power is then in step 219 used for calculating a noise rise measure as a ratio between the compensated total wideband power and the uncompensated noise floor measure achieved in step 212.

Figure 7C:
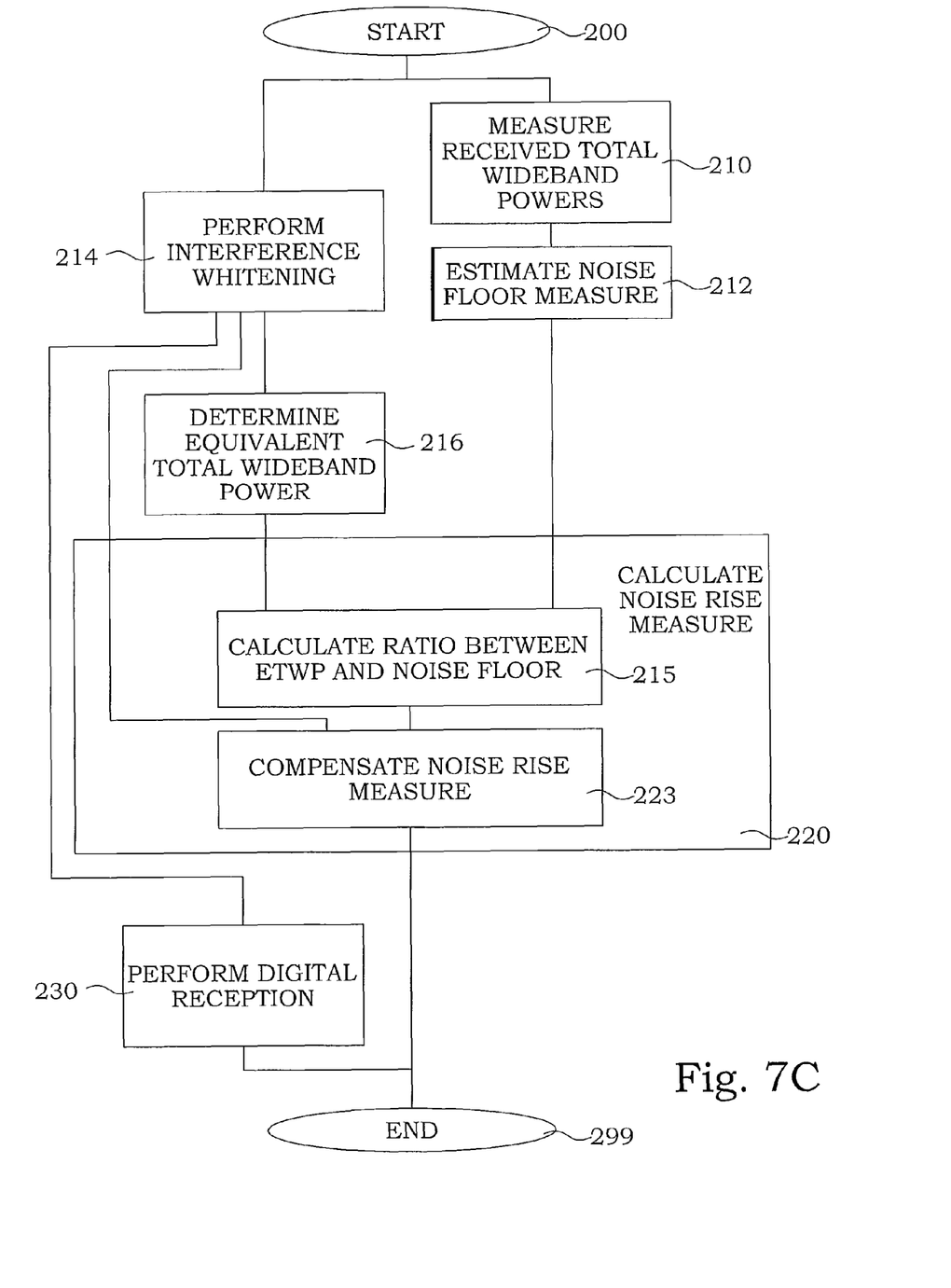

FIG. 7C illustrates yet another embodiment, in which step 220 of calculating a noise rise measure is configured differently. The equivalent total wideband power and the uncompensated noise floor measure are in step 215 used for calculating an uncompensated noise rise measure by calculating the ratio between the equivalent total wideband power and the uncompensated noise floor measure. This uncompensated noise rise measure is then compensated for the effects caused by the interference whitening in step 223, giving a true noise rise measure.

A detailed embodiment based on FDPE of the present invention is here below presented in more mathematical terms.

The signal after FDPE can be described, using (6) and (11), by:

$$Z_{pre}(m)=W_{pre}(m)H(m)Z(m)+W_{pre}(m)I(m)+W_{pre}(m)N^{thermal}(m). \quad (12)$$

Here $Z_{pre}(m)$ denotes the pre-equalized wideband signal in the frequency domain, $W_{pre}(m)$ denotes the wideband pre-equalizing filter in the frequency domain, H(m) denotes the wideband net channel response in the frequency domain, Z(m) denotes the wideband transmitted signal in the frequency domain, I(m) denotes the wideband neighbor cell interference in the frequency domain and $N^{thermal}(m)$ denotes the wideband thermal noise floor signal in the frequency domain. The equation (12) is readily transformed to the time domain with an inverse discrete Fourier transformation, rendering:

$$z_{pre}(t)=(w_{pre}h)(t)*z(t)+w_{pre}(t)*n^{thermal}(t), \quad (13)$$

where the star denotes (multi-dimensional) convolution, $z_{pre}(t)$ denotes the pre-equalized wideband signal in the time domain, $w_{pre}(t)$ denotes the wideband finite impulse response of the pre-equalizing filter in the time domain, h(t) denotes the wideband finite impulse response net channel response in the time domain, z(t) denotes the wideband transmitted signal in the time domain, i(t) denotes the wideband neighbor cell interference in the time domain and $n^{thermal}(t)$ denotes the wideband thermal noise floor signal in the time domain. It is important to understand that all signal quantities are here given before the pre-equalization step.

To obtain a measure of the load after FDPE interference whitening the RoT after this step is considered. This is in fact rather appealing since the whole uplink load is addressed at the same time. The RoT measure after FDPE processing is given by:

$$RoT^{FDPE}(t) = \frac{z_{pre}^H(t)z_{pre}(t)}{E[(w_{pre}(t)*n^{thermal}(t))^H(w_{pre}(t)*n^{thermal}(t))]}. \quad (14)$$

The numerator of (14) is straightforward to compute. Noting that the time scale for the RoT measurement in WCDMA is normally a transmission time interval (TTI), it follows that the numerator of (14) can be computed e.g. by an average of time samples over the TTI of interest (typically 2 ms or 10 ms).

The computation of the denominator of (14) requires an evaluation of the expectation of that expression. This can be done assuming the thermal noise to be white and stationary, which is a standard assumption. Note that the evolution here therefore is performed over the time interval where the pre-equalization filter remains constant. It then follows that:

$$E\left[(w_{pre}(t) * n^{thermal}(t))^H (w_{pre}(t) * n^{thermal}(t))\right] = \quad (15)$$

$$E\left[\sum_{l_1=0}^{L-1} (n^{thermal}(t-l_1))^H w_{pre}^H(l_1) \sum_{l_2=0}^{L-1} w_{pre}(l_2) n^{thermal}(t-l_2)\right] =$$

$$E\left[\left(\sum_{l_1=0}^{L-1} \sum_{l_2=0}^{L-1} (n^{thermal}(t-l_1))^H w_{pre}^H(l_1) w_{pre}(l_2) n^{thermal}(t-l_2)\right)\right] =$$

$$E\left[\sum_{l_1=0}^{L-1} \sum_{l_2=0}^{L-1} w_{pre}^H(l_1) w_{pre}(l_2) (n^{thermal}(t-l_1))^H n^{thermal}(t-l_2)\right] =$$

$$\sum_{l_1=0}^{L-1} \sum_{l_2=0}^{L-1} w_{pre}^H(l_1) w_{pre}(l_2) E\left[(n^{thermal}(t-l_1))^H n^{thermal}(t-l_2)\right]$$

$$\sum_{l_1=0}^{L-1} \sum_{l_2=0}^{L-1} w_{pre}^H(l_1) w_{pre}(l_2) \delta_{l_1,l_2} \sum_{a=1}^{A} \hat{N}_a^{thermal} =$$

$$\left(\sum_{l=0}^{L-1} w_{pre}^H(l) w_{pre}(l)\right)\left(\sum_{a=1}^{A} \hat{N}_a^{thermal}\right).$$

In (15) $\hat{N}_a^{thermal}$ denotes the estimated thermal noise floor of antenna branch a, before pre-equalization. This means that prior art noise floor estimation algorithms can be re-used. One algorithm is needed for each antenna branch.

Combining (14) and (15) results in:

$$RoT^{FDPE} = \frac{z_{pre}^H(t) z_{pre}(t)}{\left(\sum_{l=0}^{L-1} w_{pre}^H(l) w_{pre}(l)\right)\left(\sum_{a=1}^{A} \hat{N}_a^{thermal}\right)}. \quad (16)$$

The quantities above should be computed as averages or estimates over a time interval where the whitening filter of the FDOE remains constant. The result is intuitive. Since the total received wideband power is summed over all antenna branches, so is the thermal noise power floor. The RoT after FDPE is also scaled with the power of the pre-whitening filter.

Today, it is common practice to implement the computationally most intense parts of the WCDMA uplink radio receivers on application specific integrated circuits (ASICs). Typically, such ASICs provides FDPE processing for a multitude of users, using dedicated hardware. It is e.g. previously known to implement channel estimation, weight combining, demodulation and decoding on such ASICS, for multiple users. To achieve this, the ASICS may be equipped with dedicated accelerators e.g. for TURBO decoding, matrix operations and similar. This is facilitated by the fact that ASICS can be programmed to perform different tasks, exploiting a variety of such hardware accelerator resources. To our knowledge, prior to the present invention, dedicated processing means for load estimation has however not been implemented on ASICS.

In a preferred embodiment of an arrangement for noise rise estimation in a wireless communication system, at least a part of the functionality of the processor as illustrated in FIGS. 6A-C is implemented by at least one of an Application Specific Integrated Circuit (ASIC) and a Digital Signal Processor (DSP). The embodiment presents ASIC implementation of at least a subset of the above described functionality.

Embodiments of the invention discloses techniques that allow for load estimation that reflects the IS gains of FDPE, thus enhancing coverage, capacity and cell throughput at system level. Without the disclosed invention, large parts of the gains associated with FDPE would not materialize, due to the need to use too conservative margins. The apparatuses according to preferred embodiments of the present invention also have a relatively low computational complexity. In embodiments of the present invention the load for the whole cell is processed simultaneously, thereby making it possible to reuse some of the load estimation functionality.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

AGC—Automatic Gain Control
ASIC—Application Specific Integrated Circuits
CTWP—Compensated Total Wideband Power
DSP—Digital Signal Processor
EUL—Enhanced UpLink
FDPE—Frequency Domain Pre-Equalization
FFT—Fast Fourier Transform
HW—Hardware
IC—Interference Cancellation
IFFT—Inverse Fast Fourier Transform
IS—Interference Suppression
LTE—Long-Term Evolution
MMSE—Minimum Mean Square Error
RBS—Radio Base Station
RNC—Radio Network Controller
RoT—Rise over Thermal
RTWP—Received Total Wideband Power
SIR—Signal to Interference Ratio
SRNC—Serving Radio Network Controller
TTI—Transmission Time Interval
UE—User Equipment
WCDMA—Wideband Code Division Multiple Access

The invention claimed is:

1. A method for noise rise estimation in a wireless communication system, the method comprising:
   measuring received total wideband power a plurality of times;
   computing an estimate of a noise floor measure based on at least a number of said measured received total wideband powers;
   performing an interference whitening of a total received signal;
   determining an equivalent total wideband power as an available total wideband power after said interference whitening;

calculating a noise rise measure, based at least on said equivalent total wideband power and said noise floor measure; and processing said total received signal after said interference whitening in a digital receiver;

wherein said step of calculating comprises compensating of said noise rise measure for said interference whitening.

2. The method of claim 1, wherein said compensating comprises compensating of said equivalent total wideband power for effects caused by said interference whitening.

3. The method of claim 1, wherein said compensating comprises compensating of said noise floor measure for effects caused by said interference whitening.

4. The method of claim 1, wherein said compensating comprises compensating of a ratio between said equivalent total wideband power and said noise floor measure for effects caused by said interference whitening.

5. The method of claim 1, wherein said interference whitening is a frequency domain pre-equalization.

6. The method of claim 1, wherein said compensating comprises calculation of a scale factor κ representing a relation between a noise floor measure before interference whitening and a noise floor measure after interference whitening.

7. The method of claim 6, wherein said interference whitening is a frequency domain pre-equalization and wherein said scale factor κ is calculated based on a wideband finite impulse response of a pre-equalizing filter used in said frequency domain pre-equalization.

8. The method of claim 7, wherein said scale factor κ is calculated according to:

$$\kappa = \sum_{l=0}^{L-1} w_{pre}^H(l) w_{pre}(l),$$

where $w_{pre}(l)$ is the wideband finite impulse response of a pre-equalizing filter.

9. An arrangement for noise rise estimation in a wireless communication system, comprising:

a front end signal conditioning arrangement;

an interference whitener connected to said front end signal conditioning arrangement, said interference whitener being arranged to provide interference whitening of a front end signal at an output;

a processor connected to said front end signal conditioning arrangement and to said output from said interference whitener, said processor being arranged to measure received total wideband power received at said front end signal conditioning arrangement a plurality of times;

said processor being further arranged to compute an estimate of a noise floor measure based on at least a number of said measured received total wideband powers;

said processor being further arranged to determine an equivalent total wideband power as an available total wideband power on said output from said interference whitener;

said processor being further arranged to determine a noise rise measure, based at least on said equivalent total wideband power and said noise floor measure.

said processor being further arranged to compensate said noise rise measure for said interference whitening; and a digital receiver connected to said output from said interference whitener.

10. The arrangement of claim 9, wherein said processor is further arranged to compensate said equivalent total wideband power for effects caused by said interference whitening.

11. The arrangement of claim 9, wherein said processor is further arranged to compensate said noise floor measure for effects caused by said interference whitening.

12. The arrangement of claim 9, wherein said processor is further arranged to compensate a ratio between said equivalent total wideband power and said noise floor measure for effects caused by said interference whitening.

13. The arrangement of claim 9, wherein said interference whitener is a frequency domain pre-equalizer.

14. The arrangement of claim 9, wherein at least said processor is implemented by at least one of an application specific integrated circuit and a digital signal processor.

15. A base station of a wireless communication system, said base station comprising the arrangement for noise rise estimation of claim 9.

* * * * *

UNITED STATES PATENT AND TRADEMARK OFFICE
CERTIFICATE OF CORRECTION

PATENT NO. : 8,670,478 B2  
APPLICATION NO. : 13/634255  
DATED : March 11, 2014  
INVENTOR(S) : Kangas et al.

Page 1 of 1

It is certified that error appears in the above-identified patent and that said Letters Patent is hereby corrected as shown below:

On the Title Page, Item (57), under "ABSTRACT", in Column 2, Line 4, delete "(10)" and insert -- (14) --, therefor.

In the Specification

In Column 4, Line 35, in Equation (4), delete "$\Delta N(t)$" and insert -- $\Delta N(t),$ --, therefor.

In the Claims

In Column 14, Line 18, in Claim 9, delete "measure." and insert -- measure --, therefor.

Signed and Sealed this
Twenty-second Day of July, 2014

Michelle K. Lee
*Deputy Director of the United States Patent and Trademark Office*